April 23, 1963 J. W. McDUFFIE 3,086,643
HAY BALER
Filed Sept. 6, 1960 2 Sheets-Sheet 1

INVENTOR
JAMES W. McDUFFIE
BY Joseph Allen Brown
ATTORNEY

April 23, 1963  J. W. McDUFFIE  3,086,643
HAY BALER
Filed Sept. 6, 1960  2 Sheets-Sheet 2
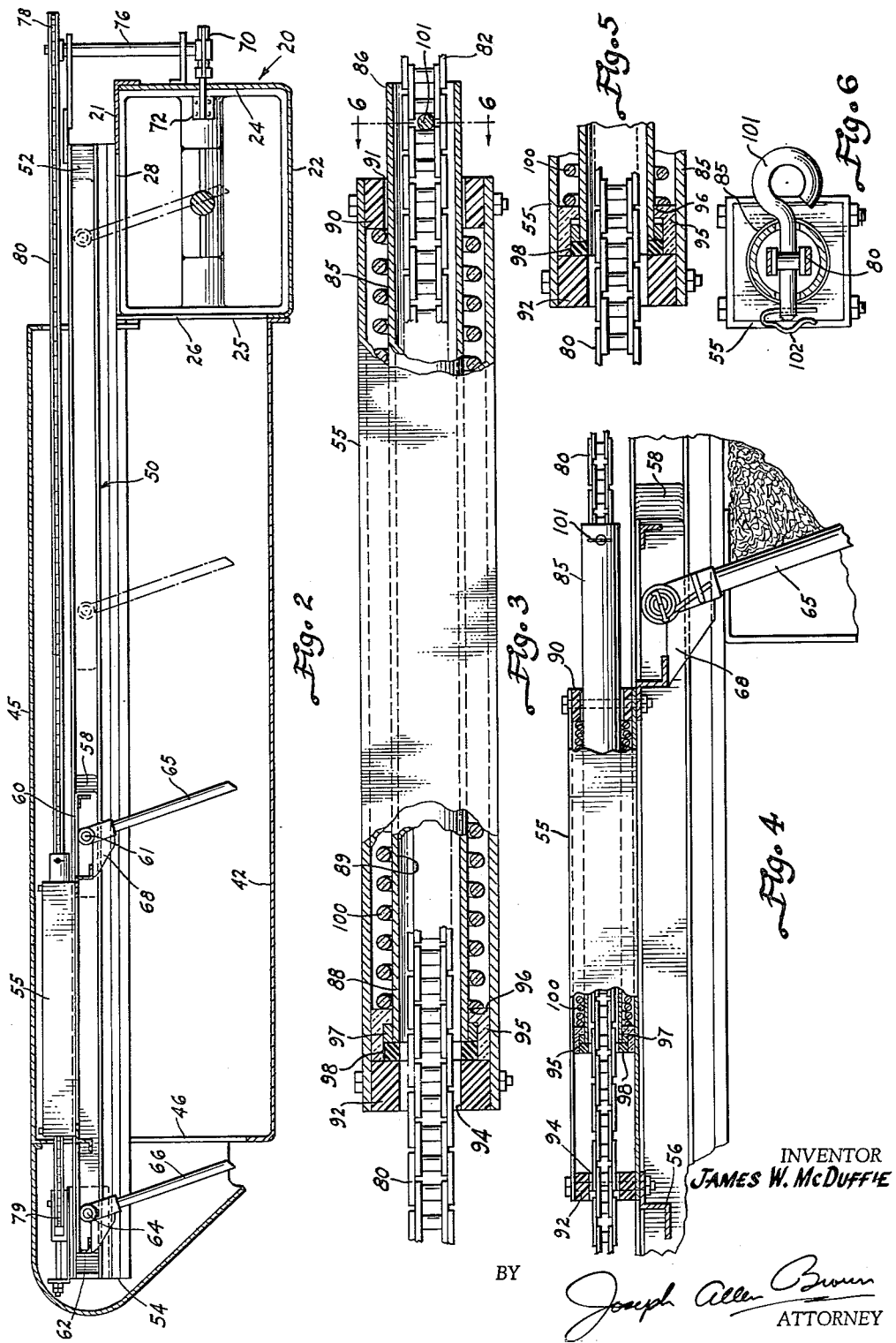
INVENTOR
JAMES W. McDUFFIE
BY
Joseph Allen Brown
ATTORNEY United States Patent Office 3,086,643
Patented Apr. 23, 1963

3,086,643
HAY BALER
James W. McDuffie, New Holland, Pa., assignor to Sperry Rand Corporation, New Holland, Pa., a corporation of Delaware
Filed Sept. 6, 1960, Ser. No. 54,013
8 Claims. (Cl. 198—221)

This invention relates generally to automatic hay balers and more particularly to a mechanism for feeding hay into a bale chamber through an opening in a side wall of the chamber.

One object of this invention is to provide a hay baler feeder mechanism which is reciprocated by an oscillating endless chain and which is adapted to yield on a feeding stroke, the forces developed as a result of such yielding being directed in optimum relation to the feeder mechanism.

Another object of this invention is to provide a feeder mechanism having a feeder carriage reciprocated in a straight line toward and away from a bale chamber by being connected to one reach of an oscillating endless chain, such straight line and the extension of said one reach being common.

Another object of this invention is to provide, in a feeder mechanism of the character described, a lost-motion connection between the drive chain and the feeder whereby when the feeder yields on a feeding stroke and then returns toward starting position, the feeder is able to overrun and thereby help in the absorption of shock loads.

Another object of this invention is to provide a feeder mechanism of the character described in which the feeder can be adjusted to any desired position relative to the chain which drives it and then quickly and easily connected thereto, the structure provided obviating any necessity for "jumping" the sprockets to obtain a desired relation between the feeder, the drive chain and the bale case of the baler.

A further object of this invention is to provide a feeder mechanism of the character described in which a more simple, rugged connection is provide between the feeder and the endless chain.

A further object of this invention is to provide a feeder mechanism of the character described which is designed for easy adjustment, simple repair and long operative life.

Other objects of this invention will be apparent hereinafter from the specification and from the recital in the appended claims.

In the drawings:

FIG. 2 is a section taken on the line 2—2 of FIG. 1 looking in the direction of the arrows and showing the feeder mechanism in retracted position in solid lines and extended position in dotted lines;

FIG. 3 is an enlarged, vertical longitudinal section through the feeder and showing the details of the lost-motion yieldable connection between the feeder and the endless chain which reciprocates it;

FIG. 4 is a fragmentary view, part section and part side elevation and showing the feeder on a feeder stroke and yielding responsive to baling conditions;

FIG. 5 is a fragmentary section of the feeder mechanism after it has returned from the yielded position of FIG. 4 and showing the overrunning situation which results between the drive chain and the feeder;

FIG. 6 is a section taken on the line 6—6 of FIG. 3 looking in the direction of the arrows and showing the connection between the feeder mechanism and the drive chain.

Figure 1:
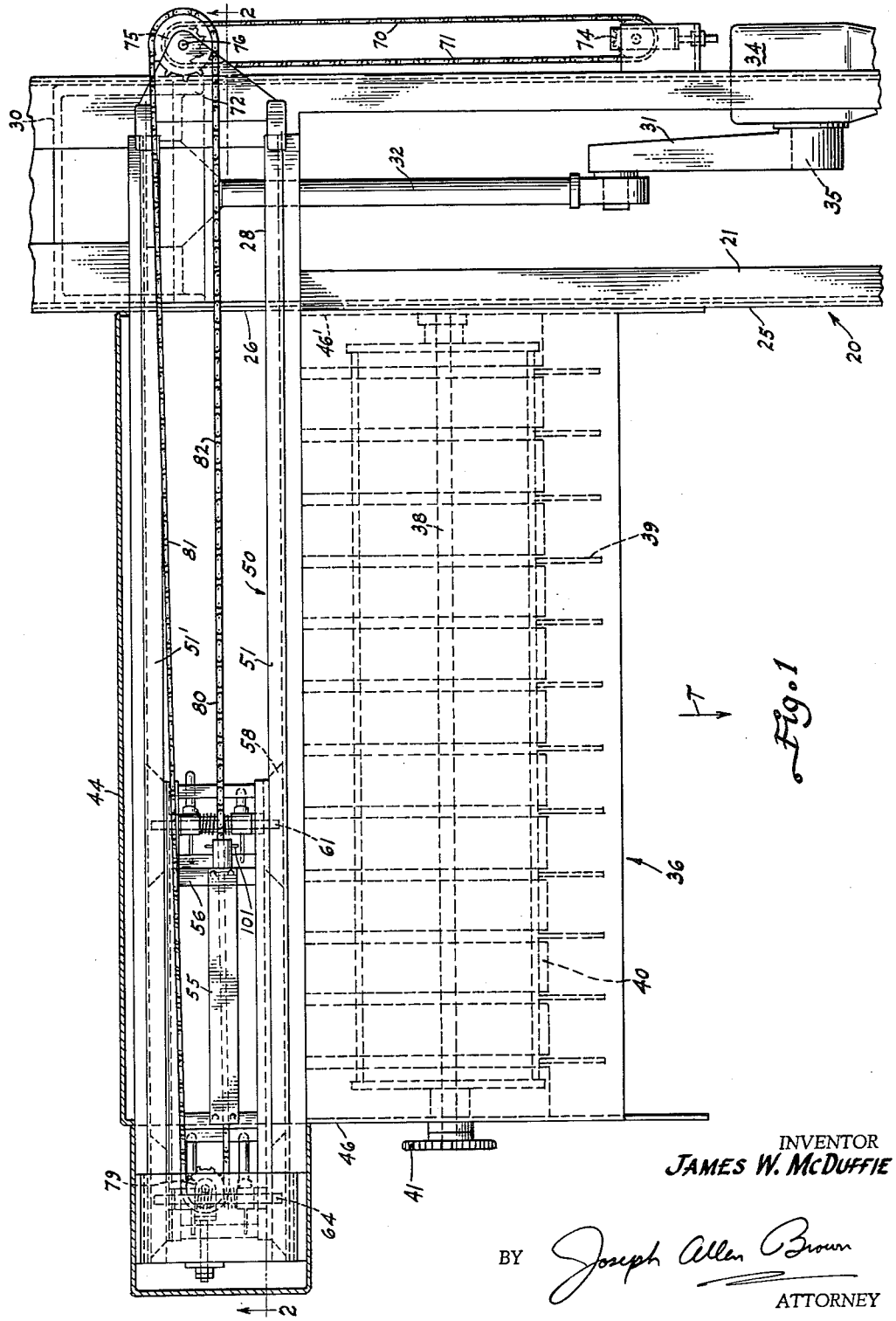
FIG. 1 is a fragmentary, plan section of a hay baler having a feeder mechanism constructed according to this invention, the baler plunger being shown in extended position and the feed mechanism retracted.

Referring now to the drawings by numerals of reference, and particularly to FIGS. 1-3, 20 denotes the bale case of a hay baler. Such bale case is rectangular in cross section (FIG. 2) and extends in a fore-and-aft direction relative to the travel of the baler indicated by the arrow T in FIG. 1. The bale case has a top wall 21, a bottom wall 22, an outside wall 24 and an inside wall 25. The inside wall 25 is provided with an inlet feed opening 26 through which crop material may be fed into the bale case. Top wall 21 has slots 28 communicating with opening 26. Reciprocable in the bale case is a plunger 30 driven by a rotatable crank arm 31 connected to the plunger by means of a connecting rod or pitman 32. The crank arm 31 receives power from a gear box 34 provided with an output shaft 35 to which the crank arm is keyed. Gear box 34 receives power from the tractor, not shown, towing the baler or from some other source such as an engine mounted on the baler.

In its reciprocable movements, plunger 30 moves rearwardly on a working stroke and past the opening 26 and slots 28 in side wall 25 and top wall 21, respectively, of the bale case. After each working stroke, the plunger retracts to a position forwardly of the opening 26. Hay delivered to the bale chamber is compressed by the plunger into bales and each bale moves progressively rearwardly as it is formed. After completion, each bale is banded by any conventional tying mechanism, not shown, and subsequently discharged rearwardly onto the ground or delivered to a trailing wagon.

Positioned along side wall 25 of bale chamber 20 and forwardly of the opening 26 is a transversely extending rotatable pick-up mechanism 36 comprising a reel 38 having angularly spaced rows of radially projecting pick-up fingers 39. The fingers in each row are laterally spaced relative to each other and separated by stripper plates 40. A drive sprocket 41 is connected to reel 38 to rotate the pick-up. Sprocket 41 is driven from any suitable source of power, not shown. Crop material resting on the ground in a windrow is adapted to be engaged by the fingers 39 and elevated. The material is moved upwardly and rearwardly over the stripper plates 40 and then deposited on a hay receiving platform or apron 42, FIG. 2. The details of the pick-up structure may be similar to that shown in U.S. Patent No. 2,757,602, issued August 7, 1956.

Platform 42 extends generally horizontally from adjacent the lower end of the opening 26. Rearwardly of the platform 42 is a vertical wall 44 and above the platform is a top wall 45. The pick-up 36 has a lateral side wall 46 (FIG. 1) at its outboard end and an inside wall 46' adjacent the side wall 25 of the bale case. Crop material engaged by the pick-up is elevated and moved rearwardly between side walls 46—46' and then deposited on the platform 42. The material is stopped in its rearward movement by the back wall 44.

The structure of the bale case and pick-up mechanism is conventional. It is recited to provide the environment of the present improvement which resides in the feeding mechanism for moving the crop material across the platform 42, through the opening 26 and into the bale case 20 between successive strokes of the plunger 30. Such mechanism comprises a track 50 having a pair of spaced track members 51 and 51' which extend transverse to the direction of travel of the baler and parallel to each other. Track 50 is spaced vertically from the platform 42, having one end 52 supported on top of the bale case 20 and an opposite outboard end 54 supported on the portion of side wall 46 rearwardly of the pick-up.

Mounted on track 50 and movable thereover is a carriage 55 which comprises a framework 56 generally rectangular when viewed in plan, FIG. 1. The carriage has four support blocks or bearings 58, one at each corner of the framework. The support blocks are made of hard wood and each block is formed to suitably engage and ride on its associated guide track of the track 50. Carriage 55 has a forward end 60 toward the bale case 20 which carries a cross shaft 61. Shaft 61 is journalled on the carriage framework and the ends of the shaft extend into the adjacent pair of support blocks 58. The carriage has a rear end 62 on which a cross shaft 64 is journalled. The ends of shaft 64 project into the adjacent support blocks 58. Mounted on the cross shafts 61 and 64 are pairs of depending feed fingers, namely a forward set of fingers 65 and a rear set of fingers 66.

Carriage 55 is adapted to move toward bale case 20, from the solid line position shown in FIG. 2 to the dotted line position. When moving toward the bale case, the feed fingers extend downwardly from the carriage as shown and engage the crop material on the platform 42. The fingers extend rigidly on a feeding stroke. However, on a return stroke they are free to pivot about their respective support shafts 61 and 64 in a counterclockwise direction. The fingers are prevented from pivoting in a clockwise direction by stop tabs 68 on the fingers engageable with the carriage framework. The fingers pivot a lay back on a return stroke responsive to engagement with hay on platform 42 so that they will not sweep hay on platform 42 away from the bale case. However, on the next working stroke, the fingers pivot downwardly toward the operative position as shown in FIG. 2 and again extend rigidly.

In order to reciprocate the carriage 55 toward and away from the bale case in timed relation with the reciprocations of the plunger 30, a drive means is provided comprising an endless chain 70, which extends in a fore-and-aft direction along the outside wall 24 of the bale case 20. Chain 70 has an inside reach 71 connected at 72 to the plunger 30. Chain 70 is supported on a forward sprocket 74 and a rear sprocket 75 rotatable about vertical axes. As the plunger 30 is reciprocated, it will be apparent that the endless chain 70 will be oscillated. The oscillation of the endless chain 70 is transmitted through sprocket 75 and vertical shaft 76 suitably rotatably supported on the bale case 20 to a drive sprocket 78 at the upper end of the shaft. Extending around sprocket 78 and an idler sprocket 79 at the outboard end of the track 50 is an endless chain 80 having a rearward reach 81 and a forward reach 82. Chain 80 is unbroken and continuous. The reach 82 extends parallel to track 50 and to the direction of movement of the carriage 55. Reach 82 is located in a vertical plane between the two track members 51 and 51' and is oscillated by virtue of the connection of chain 80 with the chain 70. Forward reach 82 is connected to carriage 55 to reciprocate the carriage in timed relation to the plunger 30. Such connection is shown best in FIGS. 3-6.

The reach 82 of the chain 80 extends through an elongate, tubular control member 85 having a forward end 86, a rear end 88 and a bore 89 through which chain reach 82 extends. Control member 85 is mounted on carriage 55 substantially midway between the forward and rear ends 60 and 62, respectively, of the carriage.

At its forward end, carriage 55 has a fixed member 90 connected thereto and having an opening 91 through which the forward end 86 of the control member 85 extends. At its rear end, the carriage is provided with a fixed stop member 92 through which chain reach 82 projects. Adjacent the rearward end 88 of the control member 85 is a sleeve like piston 95 (FIGS. 3-5) having an inwardly projecting flange 96 at a point spaced from the stop member 92. The flange 96 embraces the periphery of the rearward end of the control member. The rear end of the control member has affixed thereto an outwardly projecting flange portion 97 which is also normally spaced from the stop 92 and is engageable with the flange 96 on the piston 95. Interposed between the end 88 of the control member and flange 97 is a compressible element 98 in the form of an annular ring which fills the space between stop 92 and the adjacent end of the control member. Element 98 fits tightly into sleeve piston 95 and is bonded therein to tube 85 and flange 97, being shiftable, however, relative to piston 95. Surrounding the control member is a coil spring 100 having ends which engage the fixed member 90 and the piston 95, respectively. When in normal operating position, the carriage 55 and the components thereof assume a position as shown in FIG. 3. Spring 100 yieldably holds piston 95 in engagement with stop 92. End 88 of the control member and piston 95 are shiftable relative to each other against the resistance of element 98, the abutting flanges 96 and 98 providing a lost-motion connection between the parts.

To provide a driving connection between the endless chain 80 and carriage 55, a pin 101 is provided as shown best in FIG. 6. Pin 101 extends through the forward end 86 of control member 85 and through one of the openings between the links of chain 80. A cotter pin 102 is provided to hold pin 101 in place. One end of the pin is preferably provided with an eye or loop, as shown.

Thus, it is seen that oscillating chain 80 is connected to the carriage 55 through the connection provided by the pin 101 projecting between two links of endless chain 80 and control member 85.

When the chain 80 oscillates, the carriage 50 is reciprocated. Feed fingers 65 and 66 are moved from the solid line position shown in FIG. 2 to the dotted line position and then returned. The hay delivered from the pick-up 36 and deposited on the platform 42 is conveyed through the opening 26 in the bale case 20 and deposited in front of the plunger 30. The fingers 65 and 66 stand erect on a feeding stroke and lay back on a return stroke. If an excessive accumulation of hay occurs on the platform 42, carriage 55 is adapted to yield on a feeding stroke, as shown in FIG. 4. This will occur when the quantity of hay delivered into the bale chamber 20 exceeds a predetermined amount and sufficient to overcome the resisting force of the spring 100. Chain 80 will move relative to the carriage 55 and spring 100 will be compressed between the piston 95 and the fixed member 90. On the next retracting stroke, the parts will return toward their normal position as shown in FIG. 3. However, on a return stroke, the inertia resulting from the return of the piston 95 under the force of the spring 100 is absorbed by the control member overrunning the engagement of piston 95 with the stop 92, as shown in FIG. 5. The outwardly projecting flange 97 and control member 85 move relative to piston 95 and against the resistance of compressible element 98 (FIG. 5). At the same time, flange 97 moves away from the inturned flange 96 on the piston. Such overrunning provides a resilient absorption of the forces developed and over a greater distance thereby minimizing the shock loads to which the carriage is subjected. Wear and tear on the mechanism is minimized and the parts involved have a much longer operative life.

It will be noted that the endless chain 80 is a continuous unbroken chain. Reach 82 passes completely through control member 85 of carriage 55 having a connection therewith through the pin 101. The pin 101 is of husky construction and can be readily made stronger than the chain itself. Therefore, there is little danger of the connection between the chain and carriage breaking. Moreover, providing an endless chain 80 which is continuous, eliminates the necessity for clips and the like to connect spaced ends of the chain to the carriage. Such clips generally have a shorter operative life than the chain itself.

Moreover, with the present design the connection between endless chain 80 and carriage 55 is variable at will, whereby the position of the carriage relative to the chain can be set as desired. The operator merely has to remove the cotter pin 102 and slide the pin 101 out of its projected position through the control member 85 and the chain 80. Then the carriage can be moved relative to the reach 82 of the endless chain to a desired position. Then the pin 101 can be reinserted to provide a new connection. When otherwise constructed, that is when there is no adjustable connection between the chain and the carriage 55, it is necessary to adjust the timing of the carriage relative to plunger 30 by loosening the idler sprocket 79 and adjusting or jumping the chain relative to it. The adjustment of the carriage 55 relative to the chain 80 is required in order to position the carriage in optimum location relative to the reciprocation of the plunger.

The structure described is simple, rugged and relatively inexpensive to manufacture and assemble. The carriage 55 is readily adjustable to desired position along the endless chain 80 whereby the proper timed relationship between the carriage or feeder and the plunger 30 can be precisely established. Since the feeder mechanism operates at high speed, such as seventy strokes per minute, the elimination of breaks in the endless chain 80 provides a more rugged fool proof structure. The overrunning feature provided by the lost-motion connection of control member 85 to piston 95 and thus carriage 55 minimizes the shock loads to which the carriage is subjected after a yieldable action has occurred and the parts return to normal position. Still further, by extending the reach 82 of the endless chain 80 completely through the control member 85 and the carriage 55, the forces developed when a yielding action occurs are properly related to the feeder and no cocking or torsional forces are developed. Thus, the feeder mechanism is responsive solely to variations in the quantity of material on the feed platform 42 and not to other factors.

While this invention has been described in connection with a particular embodiment thereof, it will be understood that it is capable of further modifications and this application is intended to cover any variations, uses or adaptations following, in general, the principles of the invention and including such departures from the present disclosure as come within known or customary practice in the art to which the invention pertains and as fall within the scope of the invention or the limits of the appended claims.

Having thus described my invention, what I claim is:

1. A hay baler comprising a bale case having a feed opening in a side wall thereof, a hay receiving platform extending laterally from said side wall, a track mounted above said platform, a carriage mounted on said track for movement therealong toward and away from said bale case, hay engageable means depending from said carriage, a tubular control member mounted on said carriage and movable relative thereto, said control member having a forward end toward said bale case and a rear end remote therefrom, a fixed member on said carriage adjacent said forward end of said control member, a piston connected to said rear end of said control member, resilient means interposed between said fixed member and said piston and yieldably resisting movement of the piston toward the fixed member, an endless member having a reach extending through said control member and said tubular member being adjustable along said reach, means for connecting said endless member to said tubular member in the adjusted position of the tubular member, and means for oscillating said endless member.

2. In a hay baler as recited in claim 1, wherein said endless drive member comprises a chain having a plurality of interconnected links providing longitudinally spaced openings, and wherein said connecting means comprises a pin connected to said control member and selectively projectable through one of the openings in said chain.

3. A hay baler comprising a bale case having a feed opening in a side wall thereof, a hay receiving platform extending laterally from said side wall, a track mounted above said platform, a carriage mounted on said track for movement therealong toward and away from said bale case, hay engageable means depending from said carriage, a tubular control member mounted on said carriage and movable relative thereto, said control member having a forward end toward said bale case and a rear end remote therefrom, a fixed member on said carriage adjacent said forward end of said control member, a piston, a post-motion connection between said piston and said rear end of said control member, a spring surrounding said control member and having ends engaging said fixed member and said piston, respectively, and yieldably resisting movement of the piston toward the fixed member, an endless member having a reach extending through said control member, means connecting said endless member to said tubular member, and means for oscillating said endless member.

4. A hay baler as recited in claim 3 wherein said endless member comprises a chain and is connected to said control member adjacent said forward end of the control member.

5. A hay baler comprising a bale case having a feed opening in a side wall thereof, a hay receiving platform extending laterally from said side wall, a track mounted above said platform, a carriage mounted on said track for movement therealong toward and away from said bale case, hay engageable means depending upon said carriage, an elongated tubular control member mounted on said carriage and movable relative thereto in the direction of its elongation, said control member having a forward end toward said bale case and a rear end remote therefrom, a member fixed to said carriage and having an opening through which said forward end of said control member is projectable, a piston at the remote end of said control member, a spring surrounding said control member and interposed between said fixed member and said piston, said spring yieldably resisting movement of the piston toward the fixed member, a stop connected to said carriage and engageable with said piston to limit movement of the piston away from said fixed member, said stop having an opening aligned with said fixed member opening and said control member having a bore aligned with both of said openings, an endless member having a reach extending through said control member and through the openings in said fixed member and stop, said control member being adjustable to a desired position along said reach, detachable means connecting said enless member and said control member, means connecting said piston to said control member, and means for oscillating said endless member.

6. A hay baler as recited in claim 5 wherein said means connecting said piston to said control member comprises lost-motion means whereby when the piston has been moved toward said fixed member against the resistance of said spring and then returns toward said stop, the control member overruns the piston upon engagement of the piston with the stop.

7. A hay baler as recited in claim 6 wherein a resilient element is interposed between said remote end of said control member and said stop to yieldably resist said overrunning of said control member.

8. A hay baler as recited in claim 6 wherein said piston comprises a sleeve coaxial with said control member and having an inside diameter greater than the outside diameter of the control member, said lost-motion means comprising a radially outwardly projecting flange portion on said rear end of said control member and a radially inwardly projecting flange portion on said piston, said control member flange being located between said piston flange and said fixed member, the axial length of said piston being greater than the axial length of said control member flange.

References Cited in the file of this patent

UNITED STATES PATENTS

| | | |
|---|---|---|
| 1,281,331 | Fletcher | Oct. 15, 1918 |
| 2,191,743 | Scott | Feb. 27, 1940 |
| 2,843,086 | Graham | July 15, 1958 |